No. 782,048. PATENTED FEB. 7, 1905.
J. A. PEROU.
TREE PROTECTOR.
APPLICATION FILED MAY 4, 1904.
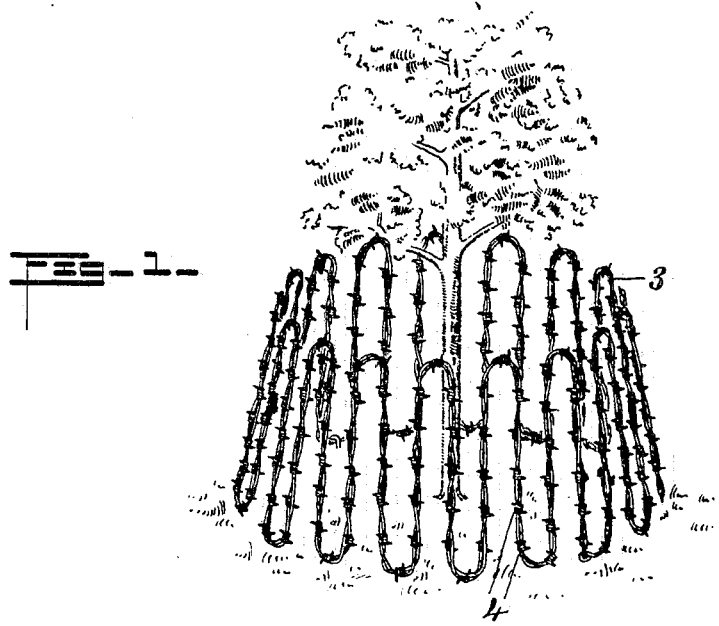
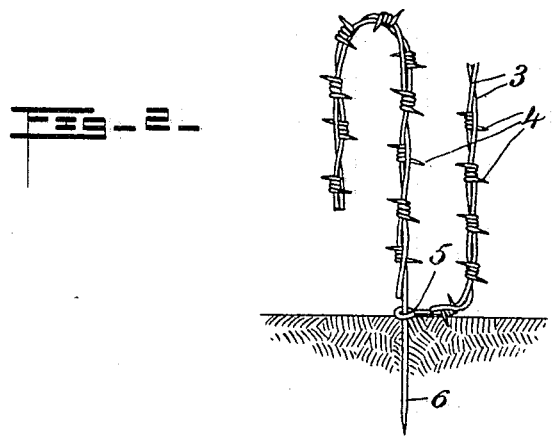
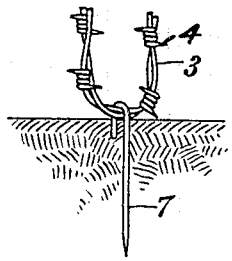
WITNESSES:
INVENTOR
John A. Perou
BY
ATTORNEYS No. 782,048. Patented February 7, 1905.

UNITED STATES PATENT OFFICE.

JOHN ALFRED PEROU, OF LOS ANGELES, CALIFORNIA.

TREE-PROTECTOR.

SPECIFICATION forming part of Letters Patent No. 782,048, dated February 7, 1905.

Application filed May 4, 1904. Serial No. 206,354.

*To all whom it may concern:*

Be it known that I, JOHN ALFRED PEROU, a citizen of the United States, and a resident of Los Angeles, in the county of Los Angeles and State of California, have invented a new and Improved Tree-Protector, of which the following is a full, clear, and exact description.

My invention relates to a device for protecting trees against rabbits and other small animals.

The invention is especially applicable for use in growing eucalyptus-trees which are set out in great numbers for commercial purposes when very small and need protection until they have attained the height of about two feet, after which they are seldom molested owing, probably, to increased bitterness of taste. When a plantation has reached this stage, the protectors can be taken away and used in other places.

Reference is to be had to the accompanying drawings, forming a part of this specification, in which similar characters of reference indicate corresponding parts in all the figures.

Figure 1 is a perspective view of a preferred form of my invention applied to a small tree. Fig. 2 is a view of a section of the device, showing a preferred manner of connecting the ends together; and Fig. 3 is a sectional view showing an additional fastening device.

In the drawings, 3 represents a piece of twisted wire provided with barbs 4. Although I have shown the ordinary form of twisted barbed wire, it will be understood that any other form of barbed metallic strip may be employed. The wire or the like is provided with reverse bends, as shown, and shaped into the general form of a cylinder, as shown, but, if desired, the upper part may be somewhat smaller than the lower part in order to provide for convenient packing for shipment. The ends of the wire are preferably connected together in the manner shown in Fig. 2, in which 5 represents a loop or eye formed upon one end, and 6 a long pin formed by an extension of the other end, which passes through the loop and is intended to be driven or forced down into the ground. Of course the lower bends throughout the circumference of the cylinder are intended to rest on the ground, and for the purpose of holding the device securely in place around the tree the pin 6 is provided on one side and a hook 7 on the other, both being embedded in the ground.

It will be obvious that the protector may be made in various sizes, according to the necessities, and that it can be made of single or double wire, as desired.

The barbs are an important feature of my invention, as they effectually prevent any small animal from penetrating through the protector. They will also prevent an animal from resting its fore paws against the protector and reaching the bark in this way. The upright parts of the wire are preferably made substantially parallel with each other, having semicircular bends at top and bottom. The barbs may be spaced any distance apart, and the device may vary from about seven to twelve inches in height and from eleven to eighteen inches in diameter. Its small size and resulting cheapness of manufacture, transportation, and handling are important features.

In those parts of California and other places having a similar climate where water for irrigation is not available the time for planting eucalyptus-trees is limited to about four weeks, and if they are destroyed it is generally impracticable to replace them before the next season, and an entire year's growth is lost. Protection for them is therefore of great importance. My invention affords a very cheap and effective device for this purpose and one that is removable readily and without harming it in any way. It can thus be used over and over again, and large numbers of them can be easily stored in a small place when not in use.

Having thus described my invention, I claim as new and desire to secure by Letters Patent—

1. A tree-protector comprising a strip of metal having barbs, and formed of a series of nearly vertical loops bent into an approximately cylindrical form.

2. A tree-protector formed of a single integral metallic strip having sharp projections and its ends meeting, and means for securing the ends together, comprising an eye and a pin adapted to be forced into the ground, said eye and pin being formed integrally on the ends of the strip.

3. A tree-protector consisting of barbed wire formed into a series of reverse loops, the protector being supported by the lower ends of said loops.

4. A tree-protector consisting of barbed metal having loops adapted to rest on the ground, and reverse loops extending upwardly from said first-mentioned loops.

In testimony whereof I have signed my name to this specification in the presence of two subscribing witnesses.

JOHN ALFRED PEROU.

Witnesses:
H. S. HERRMANN,
J. D. BETHUNE.